Dec. 3, 1968     T. D. EARL     3,414,077
AIR CUSHION VEHICLE

Filed Aug. 29, 1966     4 Sheets-Sheet 1

INVENTOR.
THOMAS D. EARL
BY
Bean, Brooks, Buckley & Bean
ATTORNEYS

INVENTOR.
THOMAS D. EARL

Dec. 3, 1968 T. D. EARL 3,414,077
AIR CUSHION VEHICLE
Filed Aug. 29, 1966 4 Sheets-Sheet 3

INVENTOR.
THOMAS D. EARL
BY
Bean, Brooks, Buckley & Bean
ATTORNEYS

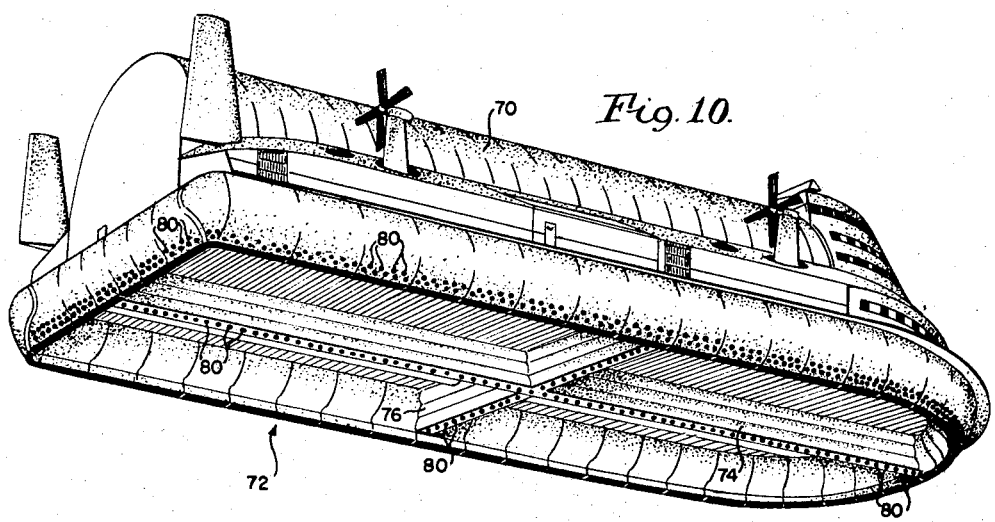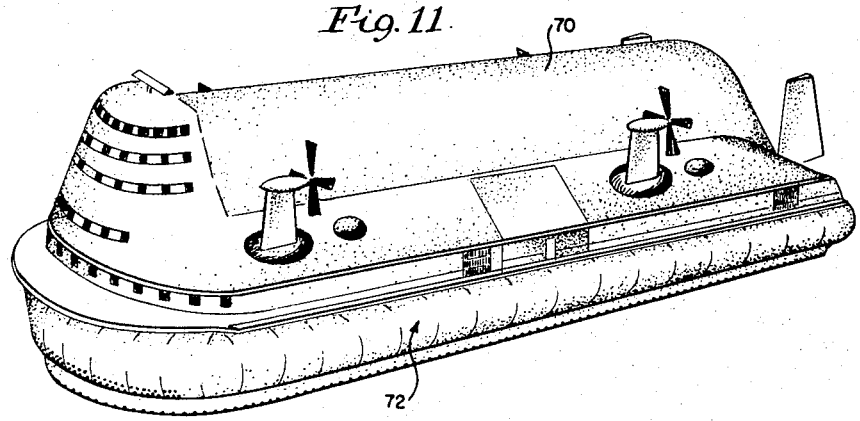

United States Patent Office 3,414,077
Patented Dec. 3, 1968

3,414,077
AIR CUSHION VEHICLE
Thomas Desmond Earl, 421 Johnson St.,
Niagara-on-the-Lake, Ontario, Canada
Filed Aug. 29, 1966, Ser. No. 575,663
1 Claim. (Cl. 180—128)

ABSTRACT OF THE DISCLOSURE

A ground effect vehicle is provided with an inflated flexible trunk provided with air bleed-off openings and valve mechanism associated with the openings to regulate air flow therethrough.

---

This invention relates to improvements in air-cushion-supported devices. More particularly, it relates to improvements in so-called "flexible trunk" (air-inflated) cell type undercarriage arrangements such as are sometimes used in lieu of a simple "skirt" device to outline an air-cushion chamber in so-called "air cushion vehicles" or "ground effect machines." Also, the invention is equally applicable to aircraft employing air-cushion type undercarriage arrangements such as shown for example in my presently pending patent application Ser. No. 440,437, filed Mar. 17, 1965 now Patent No. 3,275,270.

It has been found that in air cushion supported devices as above referred to there is a tendency for parts of the trunk structure to "flutter" when operative, which is apparently caused by a fluctuation of the ambient air pressure existent immediately outboard of the trunk jet nozzle areas. This is because at certain distances above the reaction surface for any given combination of trunk configuration, internal pressure, terrain rugosities, and other such parameters, the external pressure against the trunk wall in this area is inconstant, due to a sucking action thereon by the escaping air stream. This causes the trunk fabric to locally balloon outwardly, which in turn causes the air passageway between the trunk surface and the reaction surface to become locally constricted, thereby "compressing" the air somewhat at that locale. This in turn, operates to force the trunk wall back to its original position, thus completing a cycle which thereupon repeats itself. The oscillations so induced tend to increase in frequency, and thereupon subject the trunk fabric to severe stresses and damage.

The problem is particularly prevalent when thin and light-weight fabric is used in the trunk structure, and experiments involving increasing the thickness and/or stiffness of the trunk fabric in the affected areas have not proven such devices to be suitable solutions to the problem because of consequent undesirable weight increases and loss of functionally essential flexibilities of the structure. Furthermore, in the case of an undercarriage arrangement as shown in my copending patent application hereinabove referenced, certain portions of the trunk structure are subjected to additional hazards during landing and take-off maneuvers because parts of the undercarriage trunk structures are then subjected to destructive ground contact abrasive effects.

It is the primary object of the present invention to eliminate the aforementioned problems in connection with inflated flexible trunk type undercarriage arrangements as aforesaid in aircraft, ground effect machines, and other air cushion supported devices. Other objects and advantages of the invention will be apparent from the following specification, and the accompanying drawing, wherein.

Figure 2:
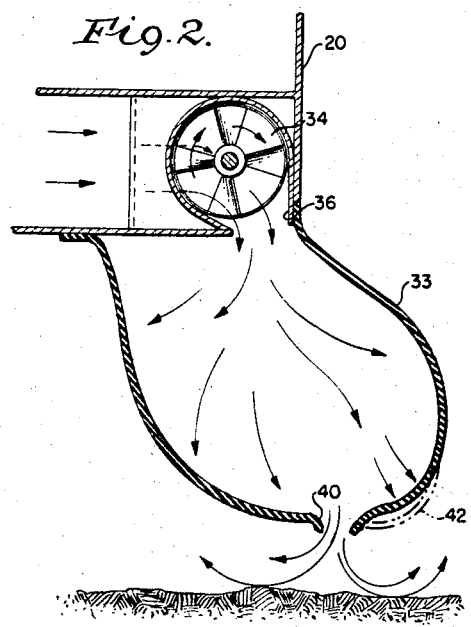
FIG. 2 is a fragmentary vertical sectional view of a typical undercarriage trunk device of the prior art, illustrating by means of companion solid and broken line showings the fluttering effects experienced by trunks of the prior art.
Figure 3:
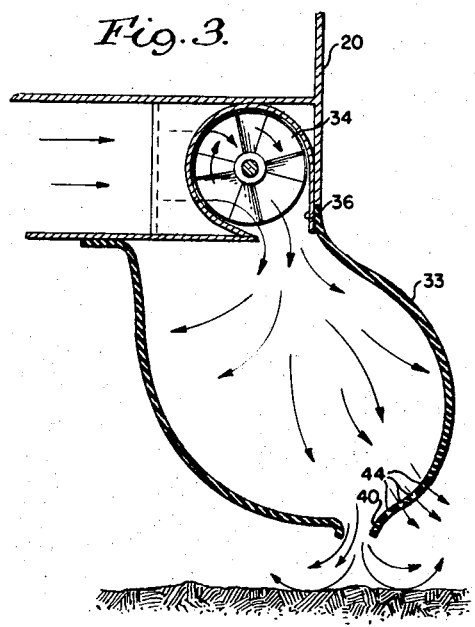
Figure 4:
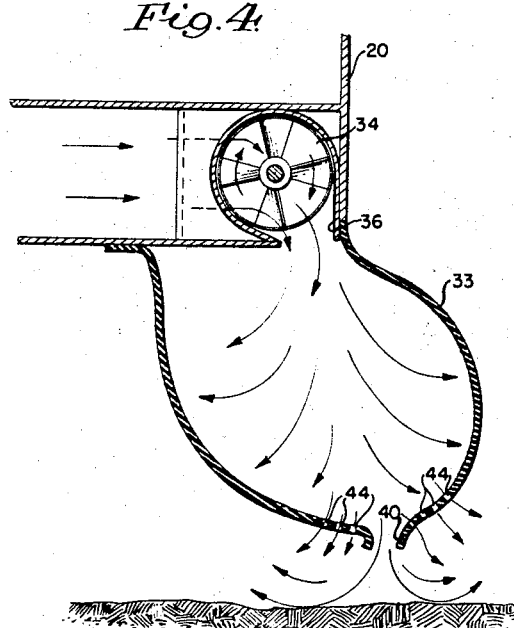
Figure 5:
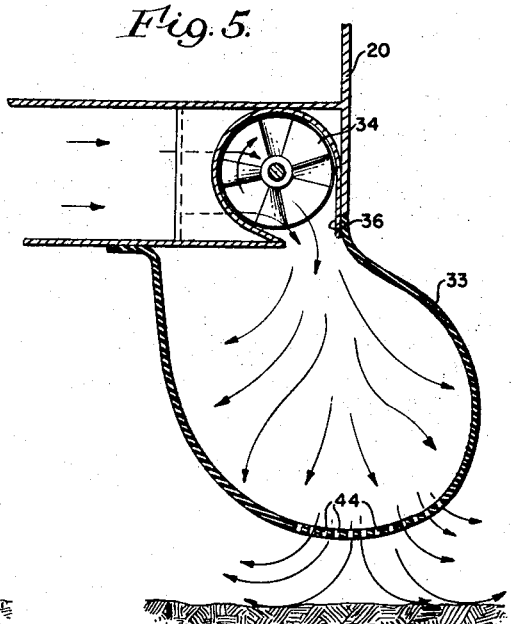
Figure 6:
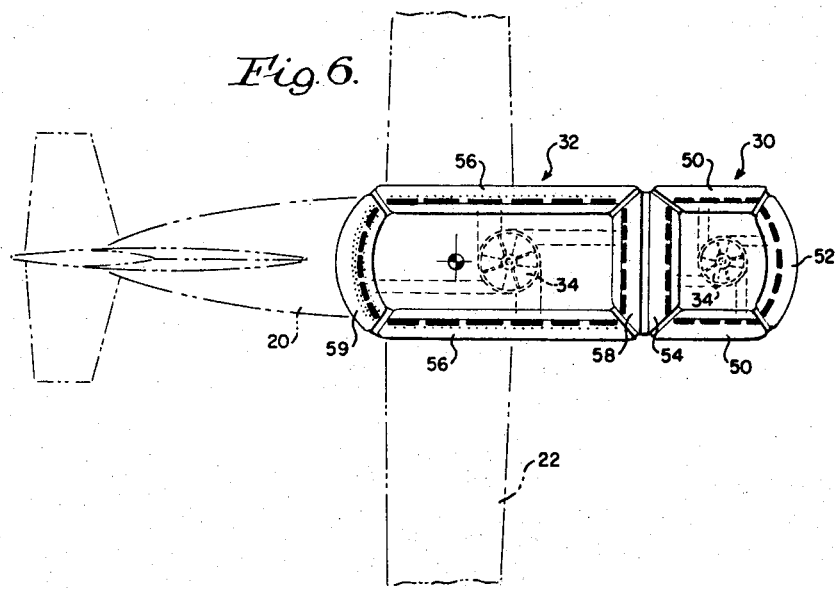
Figure 7:
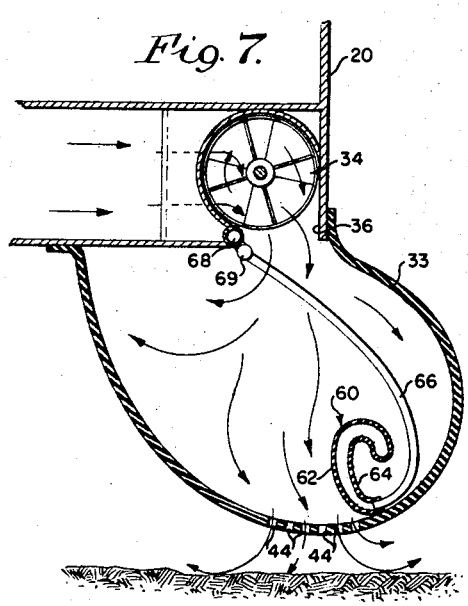
Figure 8:
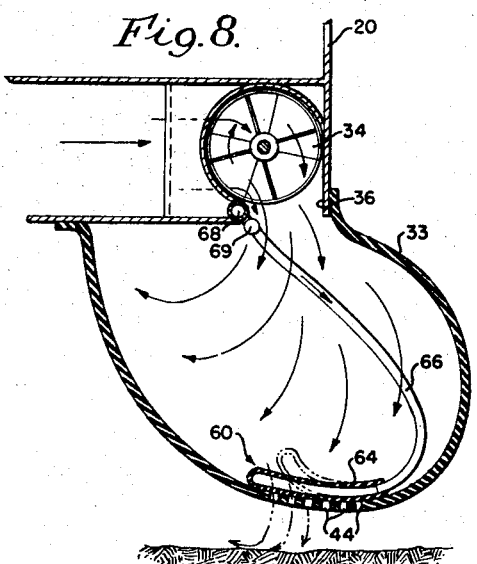
Figure 9:
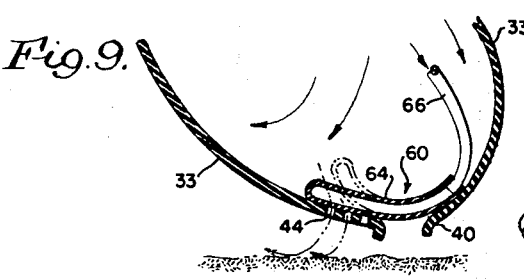

FIG. 3 corresponds to FIG. 2 but illustrates embodiment of the present invention in a trunk structure, whereby the unwanted flutter phenomena shown in FIG. 2 is avoided;

FIGS. 4, 5, correspond to FIG. 3 but illustrate modified forms of the present invention;

FIG. 6 is a bottom plan view of an airplane undercarriage arrangement embodying a preferred form of the present invention;

FIGS. 7, 8, correspond to FIG. 5 but show in combination with the structure thereof a novel control valve arrangement; the valve device being illustrated in its open and closed conditions at FIGS. 7, 8, respectively;

FIG. 9 illustrates application of the control valve device of FIGS. 7, 8, to another form of trunk construction embodying the invention;

FIG. 10 is a rear-bottom perspective view of a ground effect machine embodying the present invention; and FIG. 11 is a front-top perspective view of the machine of FIG. 10.

Figure 1:
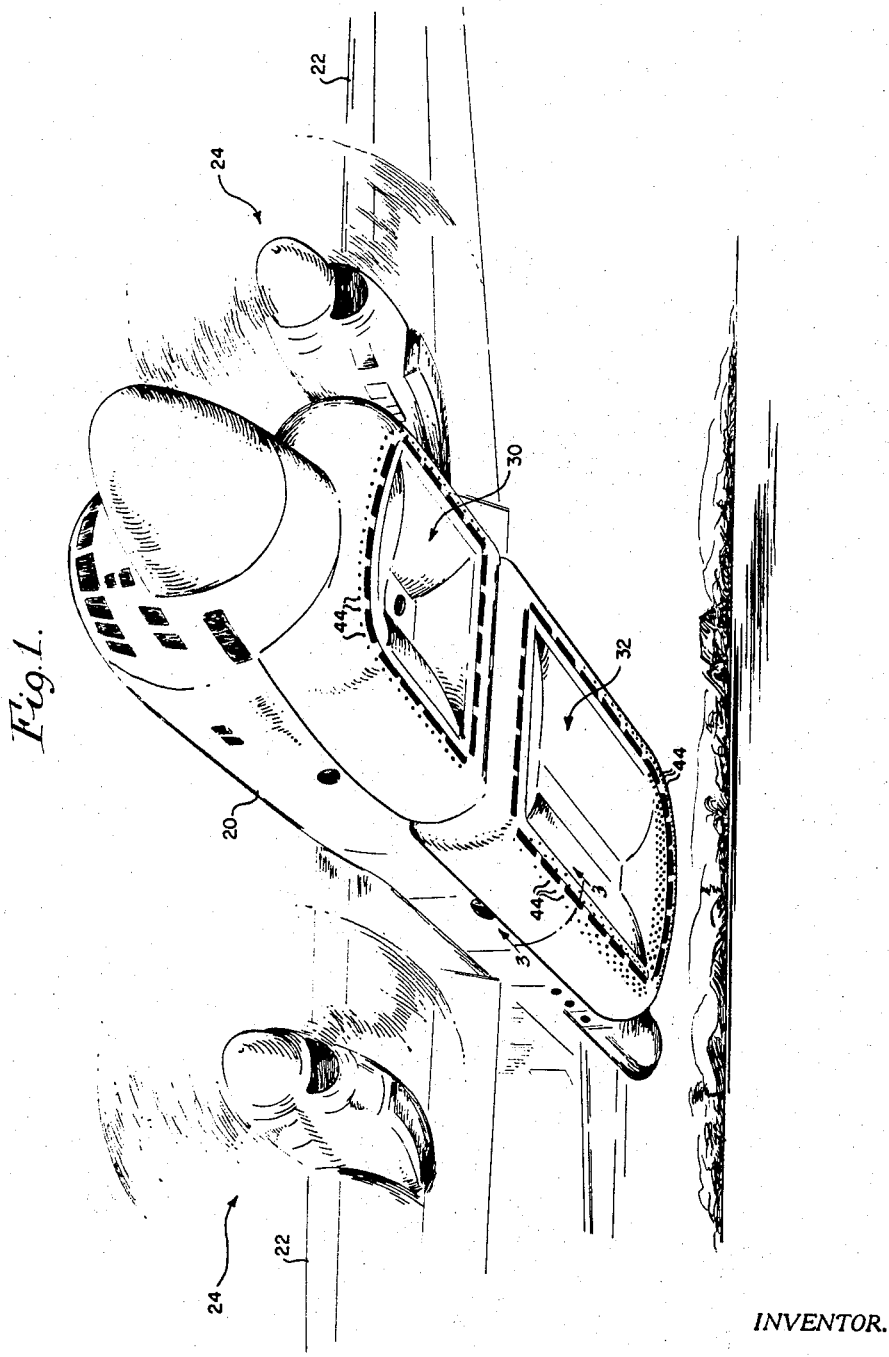
FIG. 1 is a fragmentary front-bottom perspective view of an airplane equipped with a trunk type air cushion undercarriage arrangement embodying the present invention.

As previously stated, the invention may be incorporated in the flexible trunk system of any ground effect machine or in an airplane air-cushion type undercarriage, or in any other air-cushion supported type device. For example, as shown at FIG. 1 herein, it may be incorporated in an airplane comprising generally a fuselage or body 20; wing panels 22—22; and engine-prop or jet or other propulsion power supply means as indicated generally at 24—4. However, it is to be understood that the invention may be embodied in any other type or style of aircraft.

More specifically, as shown in FIG. 1 the airplane therein is shown to be equipped with a pair of toroidal-shaped air cushion generating cells as indicated generally at 30 and 32, respectively. The cells 30, 32 may be constructed of any suitably flexible fabric or other sheet material as indicated at 33 (FIGS. 2-9) which is preferably elastic in girthwise directions, and are preferably fabricated so as to resiliently retract of their own accord into tautened, fuselage-contour-conforming condition when no compressed air is being pumped thereinto. However, when air pressure is supplied therein (as will be explained more fully hereinafter) the cells balloon out and downwardly below the airplane fuselage as shown in FIG. 1.

The cells are arranged to be fed with air under pressure as from fans as indicated at 34 by means of any suitable ducting, and as shown herein the ducting may comprise housings 36 enclosing the fans and discharging into the cells 30, 32. Thus, pumping of air through the housing 36 will cause the cells to balloon out as into the configurations shown in FIGS. 1-9. As indicated at 40, the cells are slotted along their bottom "foot-print" surfaces to provide "nozzles" through which jets of compressed air blast downwardly therefrom as shown in FIGS. 2-4, 9.

As illustrated at FIG. 2, the nozzle openings 40 are positioned so as to direct their air blasts downwardly and somewhat inwardly, so as to at the same time "feed" compressed air into the air-support chamber under the fuselage which is delineated by the flexible trunk structure, and also to provide efficient "curtains" of air circumscribing the chamber and restraining the air to remain therewithin FIG. 2 illustrates a conventional trunk and nozzle arrangement of the type referred to, and shows by means of broken lines as indicated at 42 how a section of the trunk wall fabric adjacent the nozzle opening 40 will be periodically sucked downwardly by the outrushing air from the nozzle blast until the pressure differential reverses and the fabric returns to its original sectional profile configuration, as shown in solid lines at FIG. 2. As explained hereinabove, the cycles develop at constantly increasing frequencies, and hence when the machine hovers closely adjacent a reaction surface the fabric stresses become very serious as explained hereinabove.

The present invention eliminates this tendency of the trunk fabric to flutter simply by provision of air bleed-off openings through the areas of the trunk wall structure that are subjected to the fluctuating pressure differentials referred to in connection with FIG. 2. For example, as illustrated at FIG. 3 a series of bleed-off apertures 44 may be provided through the trunk wall fabric at the outboard side of the nozzle 40. Or, as shown in FIG. 4, series of apertures as indicated at 44 may be provided through the wall fabric at both sides of the nozzle opening 40. In any case the apertures are so located as to feed air through the sections of the trunk wall fabric that would otherwise be subjected to the above referenced fluttering tendency, thereby damping the action and breaking up the possibility of resonative pressure differential reversals as explained hereinabove in connection with FIG. 2.

FIG. 6 illustrates in bottom plan view a preferred embodiment of the invention in connection with an air cushion type airplane undercarriage system wherein the trunk system designated generally at 30 actually comprises a pair of parallel side trunk portions 50, 50; a front cell portion 52, and a rear cell portion 54; said cell portions being structurally independent one from the other and separately inflatable to desired degrees to accommodate preferred operational demands. Similarly, the cell unit 32 preferably comprises separate parallel sidewise disposed cells 56—56 and front and rear transverse cells 58, 59, respectively; whereby said cells may be under pilot-control selectively inflated and/or operated as explained hereinabove to provide any pilot-dictated functionings thereof. As illustrated at FIG. 1 for example, the air bleed-off openings 44 are preferably concentrated numerically and/or otherwise functionally at those areas of the trunk wall structure where the latter is most propense to "flutter" and/or scrape against the reaction surface.

FIGS. 7 and 8 correspond to FIG. 5 but illustrate in combination therewith the employment of a valve device such as is designated generally at 60. The valve 60 comprises an envelope type device comprising flexible air-pressure-sealed side wall portions 62–64 relatively fabricated to comprise a sealed cell elastically organized to normally set in an attitude such as shown in FIG. 7. A high pressure air supply tube as indicated at 66 is connected in open communication with the valve device 60 and at its other end connects to a high pressure air supply conduit as indicated at 68. A valve device as indicated at 69 is supplied in conjunction with the conduit 66 for pilot-control of air flow to the valve 60. As shown in FIG. 8, when high pressure air is delivered through the conduit 66 the valve device 60 responds thereto by flattening out as into the configuration shown in FIG. 8, whereupon the valve device 60 covers the apertures 44 to the bottom wall portion of the trunk system, thereby terminating the air cushion support development function of the system, while at the same time sealing the truck system against air escape therefrom whereby the latter provides a physically-cushioned undercarriage support for the machine when resting upon either a land or water surface. FIG. 9 illustrates application of the valve device 60 to a trunk system as shown for example in either of FIGS. 3–4; and it will be thereby appreciated that the functional features as described hereinabove in connection with FIGS. 7, 8, are equally available in connection with the arrangement with FIG. 9.

FIGS. 10, 11, illustrate application of the present invention to a relatively large-sized ground effect machine comprising generally a body portion 70 circumscribed at its bottom area with an inflated flexible trunk system as indicated generally at 72. As explained hereinabove, the trunk system generally delineates the air-support-cushion area under the vehicle, but as illustrated herein the "air cushion" chamber in the case of a large machine is preferably sub-divided into a plurality of chambers by means of a fore and aft running keel device 74 and a transverse running partition device 76. Thus, as shown in FIG. 10, the air cushion support space under the vehicle is sub-divided into four separate air cushion spaces. In accordance with the present invention the inflated cell wall portions disposed perimetrically thereof are perforated as indicated at 80 (FIG. 10) throughout the cell wall portions coming in close proximity with the reaction surface, as explained in detail hereinabove.

I claim:

1. In an air-cushion outlining trunk system comprising the undercarriage component of a machine adapted to be levitated in friction-free relation above a reaction surface; said trunk system comprising an air-inflated balloon-like wall structure of flexible fabric having air-jet nozzle openings therethrough at the footprint areas of said trunk system, the improvement comprising; air bleed-off apertures through the trunk fabric at positions adjacent said nozzle openings and valve means for controlling bleed-off through said apertures.

References Cited

UNITED STATES PATENTS

| | | | |
|---|---|---|---|
| 3,205,847 | 9/1965 | Smith | 180—126 XR |
| 3,275,270 | 9/1966 | Earl et al. | 244—110 |

FOREIGN PATENTS

| | | |
|---|---|---|
| 938,913 | 10/1963 | Great Britain. |
| 1,028,045 | 5/1966 | Great Britain. |

MILTON BUCHLER, *Primary Examiner.*

P. E. SAUBERER, *Assistant Examiner.*